Figure 1:
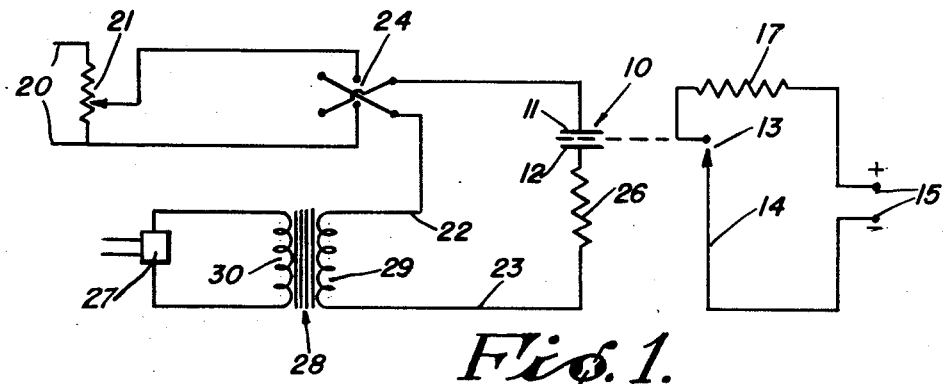

Nov. 26, 1957  R. F. CLINE  2,814,739
PULSE WIDTH MODULATOR
Filed Nov. 4, 1955

INVENTOR.
ROBERT F. CLINE
BY
Attorney

United States Patent Office 2,814,739
Patented Nov. 26, 1957

2,814,739

PULSE WIDTH MODULATOR

Robert F. Cline, Arcadia, Calif., assignor to Electric Machinery Mfg. Company, Minneapolis, Minn., a corporation of Minnesota Application November 4, 1955, Serial No. 545,089

4 Claims. (Cl. 307—132)

This invention relates to a novel pulse width modulator, that is, a device or circuit capable of producing current pulses which are modulated in width. The circuit may be referred to as a "chopper" circuit.

Pulse width modulators are known to the electronic art and it is known in the prior art to provide a pulse width modulator by means of using a clipper circuit or device. In the prior art, ordinarily, pulse width modulator circuits employ electronic tubes and triggering devices, etc., and usually involve a relatively complicated array of circuitry.

The present invention involves a novel circuit mechanism for producing current pulses suitably modulated in width, and at desired frequencies without the use of electronic tube circuitry, trigger mechanisms, etc. This invention utilizes a modern commercial device in the form of an electrostrictive relay. This particular relay is itself the subject of prior patent applications which will be referred to presently. The relay is a device which is capable of transferring its contacts upon the application of a pulse of energy, that is, a voltage pulse and of retransferring its contacts upon removal of the voltage applied. The device is electrostrictive as explained in the prior applications in that it operates in response to a voltage pulse and it is independent of polarity, that is, it operates the same in response to the application of either polarity. The device has very distinctive characteristics in that its operation requires only approximately one millijoule of energy. It requires only one microampere of current to actuate it. The electrostrictive relay is operative in response to a voltage pulse of 10 microseconds' duration and transfer of the contacts takes place within 15 milliseconds after the voltage pulse has been applied.

My invention utilizes the particular characteristics of the electrostrictive relay, which, in combination with the application of D. C. and A. C. voltage to the relay, the result is that the system becomes a pulse width modulator, producing modulated current pulses in the output circuit of the electrostrictive relay.

The principle of operation of the invention is that a variable D. C. voltage is applied to the electrostrictive relay in combination with variable A. C. voltage. The two voltages are adjustable so that sufficient operating voltage is applied to the electrostrictive relay during only part of each half wave of the applied A. C. Thus, the two voltages may be adjusted relatively, as, for example, the D. C. may be adjusted so that the combined voltage is only sufficient to operate the electrostrictive relay during an adjustable portion of the A. C. cycle. The system may be arranged so that the electrostrictive relay is operative on both the positive and negative peaks of the applied A. C. voltage.

In the light of the foregoing, it is a primary object of the invention to provide a pulse width modulator embodying an electrostrictive relay having contacts, the relay being controlled by an applied combined D. C. and A. C. potential, such that the relay is operative during a selected portion of the cycle of the applied A. C. voltage.

Another object of the invention is to provide a pulse width modulator as in the foregoing object, wherein the electrostrictive relay has a load circuit including a resistor.

Another object of the invention is to provide a pulse width modulator as in the foregoing objects, wherein the source of the D. C. voltage includes a voltage reversing switch whereby the voltage of the D. C. applied to the electrostrictive relay may be reversed in polarity.

Another object of the invention is to provide a pulse width modulator as in the foregoing objects, wherein the D. C. and A. C. voltage supplies are variably adjustable and wherein the frequency of the A. C. supply may be adjusted.

Figure 2:
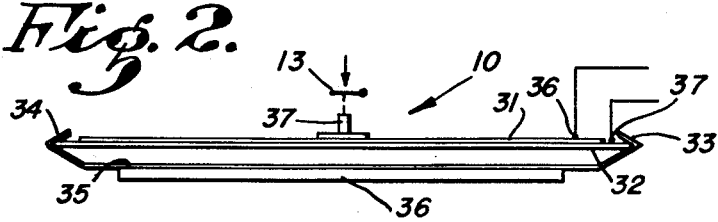
Figure 3:
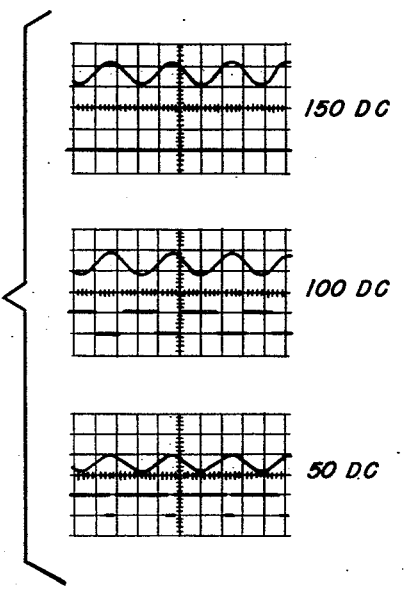

Further objects and numerous advantages of the invention will become apparent from the following detailed description and annexed drawings wherein:

Fig. 1 is a schematic circuit diagram of the pulse width modulator of this invention;

Fig. 2 is a schematic view of the electrostrictive relay which is used in the circuit of the invention; and Fig. 3 is a view of a diagrammatic representation of the A. C. and D. C. potentials applied to the electrostrictive relay with the D. C. being shown at various values relative to the value of the A. C.

Referring now more particularly to the drawings, the circuit diagram in Fig. 1 shows the electrostrictive relay diagrammatically as indicated at 10. The electrostrictive relay, as will be described more in detail below, is primarily a capacitive element as indicated by the numerals 11 and 12. It actuates electrical contacts as indicated by the numeral 13 which are in an output or load circuit 14. The output circuit by way of example is shown as having a 6 volt D. C. power supply, as indicated at 15. In the output circuit is a resistor 17, the value of which may be arbitrarily selected so as to establish a suitable desired current through the contacts 13.

The power supply to the electrostrictive relay 10 includes a D. C. voltage source and an A. C. voltage source. The D. C. voltage source is indicated diagrammatically at 20 and it may, for example, be a variable source, variable from 0 to 250 volts, and it may be adjusted by way of a potentiometer, for example, as indicated at 21. The circuit for applying voltage to the capacitive element of the electrostrictive relay is indicated by the numerals 22 and 23. In this circuit is a voltage reversing switch 24 by which the polarity of the D. C. voltage applied to the electrostrictive relay 10 can be reversed for purposes which will be presently explained. In the circuit of the capacitive element of the electrostrictive relay 10 is resistor 26 which may have a value selected as appropriate to the particular application of the pulse width modulator. In the circuit for applying voltage to the electrostrictive relay is the secondary of a two winding isolation transformer 28. The secondary is identified by the numeral 29 and the primary by the numeral 30. The voltage applied to the transformer 28 may be adjustable, for example, from 0 to 200 volts by means of a potentiometer or variable voltage transformer. The frequency of the applied voltage may also be adjusted, for example, over the range from 20 cycles per second to 300 cycles per second or more by a frequency changer as shown at 27. The isolation transformer 28 isolates the D. C. circuit of the electrostrictive relay 10 from its A. C. power supply.

Referring now more in detail to Fig. 2 of the drawings, this figure shows the electrostrictive relay 10 more in detail. The electrostrictive relay is now a well identified commercial device. One form of the relay is disclosed in detail in patent application Serial No. 498,473 of Joseph W. Crownover, filed April 1, 1955. As shown schematically in Fig. 2, the relay comprises an electrostrictive capacitive actuator element 31 which is bonded to a flexible metallic electrode strip 32. The electrode 32 is mounted at its ends between flexible clips or brackets 33 and 34 upstanding from a transverse member 35. The member 35 is suitably attached to a base 36. The electrostrictive element 31 has an electrode formed on its opposite face, preferably by simply having the electrode painted thereon with silver paint. The element 31 therefore has electrodes on its opposite faces to which electrical connections are made, as shown at 36 and 37. Thus, the elements 31 and 32 and their electrical connections constitute the actuator as shown at 10 in Fig. 1. In operation, when a voltage is applied across the electrostrictive element, it expands in thickness dimension and contracts along its longitudinal dimension. By virtue of its being bonded to the member 32, the dimensional change results in bowing or flexure of the unit such that a physical displacement takes place at its mid point. Attached to the mid point of the unit is a stem 37 which actuates contacts 13 between open and closed positions.

As pointed out in the earlier application referred to, the electrostrictive relay is a very distinctive device, in that it is strictly voltage responsive and that it is operative in response to a pulse of voltage. The electrostrictive material is a ceramic having a high dielectric constant in which the electrostrictive effect has been greatly enhanced and the tendency of the material to retain polarization charge has been reduced to a minimum. The electrostrictive effect is distinguished from piezoelectric effect in that the latter is dependent upon remanent polarization, that is, polarization charge, and further that the electrostrictive effect is independent of polarity in that the deformation in response to voltage is in the same sense irrespective of the polarity. As pointed out in the earlier application, the preferred electrostrictive materials are barium titanate materials including an additive as an impurity which may be one that shifts the Curie point to a particular value. The electrostrictive relay is essentially a capacitive element having a very high leakage resistance.

As pointed out in the foregoing, the relay is operative in response to an applied voltage which may be for example 100 volts. As also pointed out, the relay is operative to transfer its contacts in response to a pulse of 10 microseconds duration and the transfer of the contacts takes place within 15 milliseconds after the pulse has been applied. The contacts retransfer upon removal of the voltage and discharge of the relay.

The operation of the pulse width modulator using the electrostrictive relay may be understood from the following and with reference to the curves of Fig. 3. These figures represent voltage supplies of 50 volts A. C. and 50, 100 and 150 volts D. C. The lower part of Fig. 3 represents a system having 50 volts D. C. applied to the electrostrictive relay; the middle part of Fig. 3 illustrates the application of 100 volts D. C. and the upper part of Fig. 3 illustrates the application of 150 volts D. C. When the applied voltage is significantly greater than 100 volts, the electrostrictive relay operates and transfers its contacts, that is, closes the contacts 13 causing a voltage to appear across the resistor 17. From the upper part of Fig. 3, it can be observed that under these circumstances with 150 volts superimposed on the A. C. the electrostrictive relay remains closed continuously. The line or broken lines underneath the sinusoidal wave represent the voltage across the resistor 17. The operation of the contacts 13 of the electrostrictive relay is such as to produce essentially a square wave in the output circuit of the relay. The lower part of Fig. 3 illustrates the application of 50 volts D. C. bias. It can be seen that with 50 volts D. C. combined with or superimposed on the A. C. the combined voltage is sufficient only at the positive peak of the sinusoidal wave to actuate the relay and its contacts are therefore closed for only a very small part of the A. C. cycle. In the middle part of Fig. 3 the drawing illustrates the application of 100 volts D. C. and with this D. C. voltage superimposed on or combined with the A. C., it can be seen that the electrostrictive relay is closed or operated for a considerably greater part of the A. C. cycle, during which the combined voltage is sufficient to cause it to operate. The characteristics of the electrostrictive relay are such that it may operate and remain synchronized with an A. C. frequency as high as, for example, 300 cycles per second. This is possible because of the high speed of response as explained above which is inherent in the electrostrictive relay. It can be seen therefore that the arrangement of this invention provides a pulse width modulator embodying the ultimate in simplicity and obviating the need which has been present in the prior art of a much more cumbersome array of equipment to provide a pulse width modulator. Even with an A. C. frequency that varies from cycle to cycle, the electrostrictive relay is able to remain synchronized with it. By appropriately adjusting the value of the applied D. C. voltage, it is obvious that the interval of time during which the contacts of the electrostrictive relay are closed can be varied from 0% to 100% of the time for 1 A. C. cycle. If desired, the voltage values applied to the electrostrictive relay may be adjusted so that the contacts of the relay remain closed for one-half of the time of an A. C. cycle, thus, producing in effect a square wave output from the electrostrictive relay.

From the foregoing, it can be understood that the electrostrictive relay may be operated whenever the A. C. voltage peak exceeds 100 volts and that it may operate on either the positive or negative peaks depending on the polarity of the applied D. C. From the foregoing, those skilled in the art will observe that I have provided an improved and extremely simple pulse width modulator or chopper which obviates the use of electronic tube devices, triggering mechanisms, etc. The device and circuit is susceptible to adjustment to provide pulses of desired width and frequency.

The foregoing is illustrative of a preferred form of my invention, it being understood that various modifications and alternatives may be adopted by those skilled in the art, all of which are to be considered as coming within the scope of the claims appended hereto.

I claim:
1. In a pulse width modulator, in combination, an electrostrictive relay comprising an element operative in response to voltage pulses of short duration, said relay having contacts and an output circuit controlled thereby, a source of D. C. voltage connected to the active element of said relay, and a source of A. C. voltage connected to said active element, said voltage sources being adjustable relatively whereby to apply operating voltage to said relay for variable portions of the cycle of said A. C. voltage to produce a modulated signal in said output circuit.

2. In a pulse width modulator, in combination, an electrostrictive relay operative in response to voltage pulses of short duration, said relay having contacts and an output circuit controlled thereby, a source of D. C. voltage connected to said relay and a source of A. C. voltage connected to said relay, the combined value of said voltages being such that the peak voltages of said A. C. source are sufficient to operate said relay whereby said relay is operative during portions of the cycle of said A. C. voltage, depending upon the instantaneous combined values of the D. C. voltage and the A. C. voltage.

3. In a pulse with modulator, in combination, an electrostrictive relay having a voltage sensitive element operative in response to voltage pulses of short duration, said relay having contacts and an output circuit controlled thereby, a source of D. C. voltage connected to the active element of said relay, and a source of A. C. voltage connected to said active element, means for varying the frequency of said A. C. source, said voltage sources being variably adjustable whereby to apply operating voltage to said relay for variable portions of the cycle of said A. C. voltage whereby pulses appear in said output circuit, depending upon the frequency of the A. C. voltage and the combined magnitude of the D. C. and A. C. voltage applied to the said relay.

4. In a pulse width modulator, in combination, an electrostrictive relay operative in response to voltage pulses of short duration, said relay having contacts and an output circuit controlled thereby, a source of D. C. voltage connected to the active element of said relay, and a source of A. C. voltage connected to said active element, said voltage sources being adjustable relatively whereby to apply operating voltage to said relay for variable portions of the cycle of said A. C. voltage, the said D. C. voltage source being adjustable to a value such that the relay is operative during substantially a half cycle of the A. C. source where the output of the relay is essentially a square wave.

No references cited.